Patented Oct. 4, 1927.

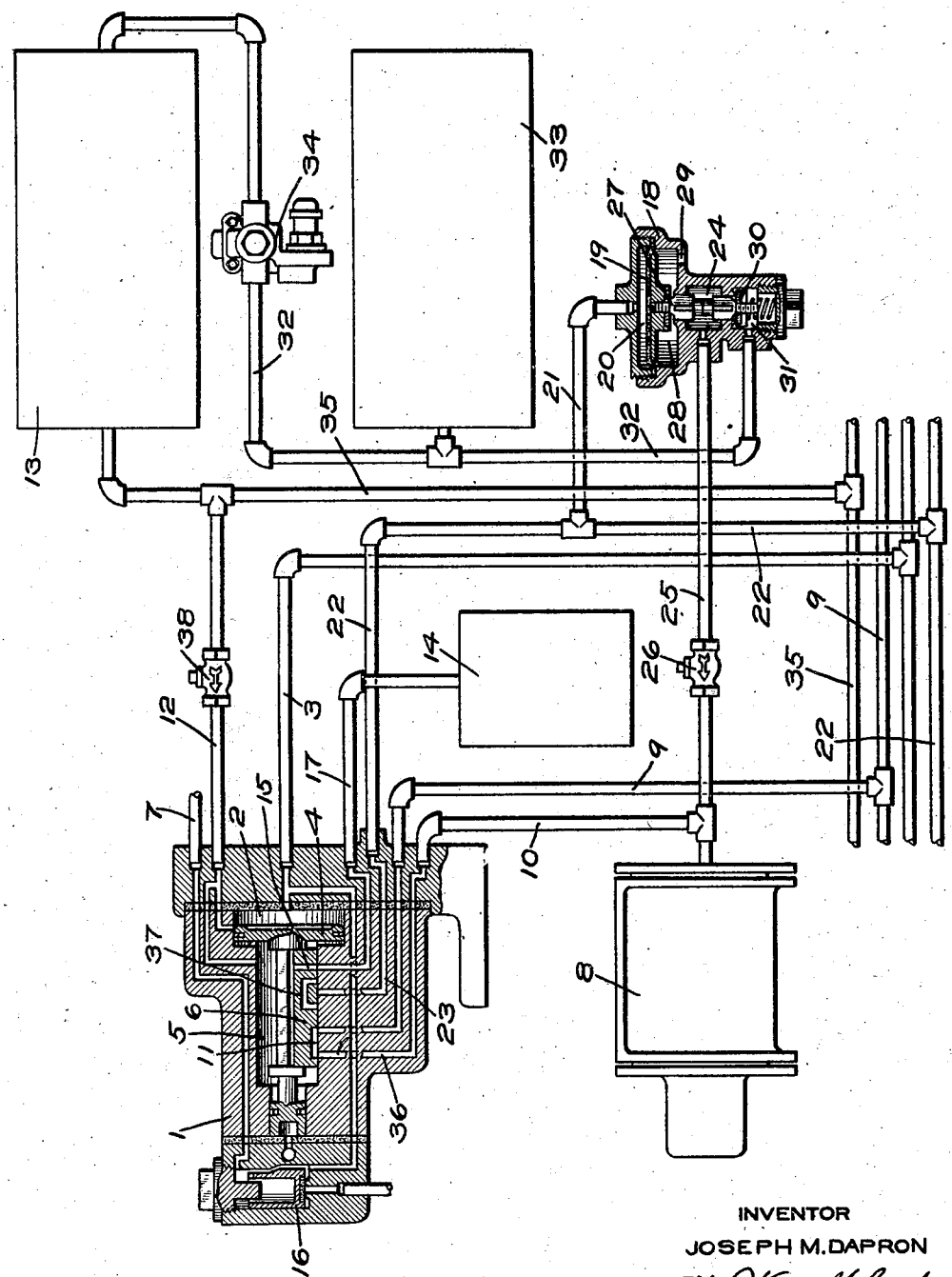

1,644,568

UNITED STATES PATENT OFFICE.

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed November 2, 1926. Serial No. 145,778.

This invention relates to fluid pressure brakes, and the principal object of the invention is to provide a fluid pressure brake equipment having improved means for securing a high brake cylinder pressure in an emergency application of the brakes.

In the accompanying drawing, the single figure is a diagrammatic view, partly in section, of a fluid pressure brake equipment embodying my invention.

In order to illustrate an application of my invention, I have shown a brake equipment of the safety car control type employing an emergency valve device as indicated generally by the reference numeral 1.

The emergency valve device may comprise a casing having a piston chamber 2, connected to the brake pipe 3 and containing a piston 4, and having a valve chamber 5 containing a slide valve 6 adapted to be operated by piston 4. The valve casing also contains a relay valve 16 having one side connected to a control pipe 7 and adapted upon a reduction in pressure in the control pipe for venting fluid from the brake pipe 3.

In the normal release position of the emergency valve device, the brake cylinder 8 is connected to the straight air pipe 9 through pipe 10 and cavity 11 in the slide valve 6. Valve chamber 5 is connected through pipe 12 with a main reservoir 13 and in release position of the emergency valve device, fluid is supplied from valve chamber 5 to a sand reservoir 14, through port 15 in slide valve 6 and pipe 17.

According to my invention, a relay valve device is provided comprising a casing 18 containing a flexible diaphragm 19, having the chamber 20 at one side connected through pipe 21 to a pipe 22 and passage 23, leading to the seat of slide valve 6, the pipe 22 being the usual pipe through which fluid under pressure is supplied to effect the sanding of the rails.

A chamber 24 in the casing 18 is connected to the brake cylinder 8 through a pipe 25 containing a non-return check valve 26.

The diaphragm 19 is adapted to operate an exhaust valve 27 which controls communication from chamber 24 to chamber 28 having an atmospheric outlet port 29 and a supply valve 30, which controls communication from chamber 31 to chamber 24. Chamber 31 is connected through pipe 32 with a main reservoir 33.

The main reservoir 33 is maintained charged with fluid under pressure at, for example, a pressure between 60 and 70 pounds, and the main reservoir 13 is maintained charged with fluid under pressure at, for example, a pressure of 50 pounds, the main reservoir 13 being charged from the main reservoir 33 through pipe 32 and a feed or reducing valve device 34, adjusted so as to supply fluid at 50 pounds to the reservoir 13.

The usual brake valve (not shown) is supplied with fluid under pressure from the low pressure main reservoir 13 through main reservoir pipe 35 and the pressure of fluid in said reservoir is the pressure normally used under service conditions.

When, however, an emergency application is effected by reducing the pressure in the brake pipe 3, the emergency piston 15 is shifted to emergency position, and the emergency slide valve 6 is operated so that passage 36 is opened to the valve chamber 5. Fluid at the pressure carried in the main reservoir 13 is then supplied to the brake cylinder 8. In emergency position, the slide valve 6 connects the sand reservoir pipe 17, through a cavity 37 with the sand pipe 22, so that fluid under pressure is supplied from reservoir 14 to effect the sanding of the rails and at the same time is supplied to the diaphragm 19 of the relay valve device. Said diaphragm is thereupon actuated, so as to close the exhaust valve 27 and open the supply valve 30.

Fluid under pressure at the higher pressure carried in the main reservoir 33 is then supplied to pipe 25 and the brake cylinder 8, so that a higher pressure is obtained in the brake cylinder in an emergency application of the brakes, than in a service application. A check valve in the pipe 12, prevents back flow of fluid at the higher pressure from the brake cylinder through the emergency valve device to the main reservoir 13.

The relay valve device will remain open long enough to ensure that the brake cylinder pressure will be built up to that in the reservoir 33.

The relay valve device will automatically return to release position, either through the exhaust of air from the sand pipe 22 and the sand reservoir 14 or by the usual operation of releasing the brakes by operation of the brake valve device.

Having now described my invention, what I claim as new and desire to secure by Letters Patent, is:—

1. In a fluid pressure brake, the combination with a brake cylinder, of two reservoirs normally charged with fluid at different pressures, the reservoir charged with fluid at the lower pressure being the normal source of fluid under pressure for the brake system, and means operating in an emergency application of the brakes for supplying fluid from the reservoir charged with fluid at the higher pressure to the brake cylinder.

2. In a fluid pressure brake, the combination with a brake cylinder, of two reservoirs normally charged with fluid at different pressures, the reservoir charged with fluid at the lower pressure being the normal source of fluid under pressure for the brake system, a relay valve device for controlling communication from the reservoir charged with fluid at the higher pressure to the brake cylinder, and an emergency valve device operated in effecting an emergency application of the brakes for operating said relay valve device.

3. In a fluid pressure brake, the combination with a brake cylinder, of a main reservoir normally charged with fluid under pressure from which fluid under pressure is supplied for charging the brake system, an additional main reservoir normally charged with fluid under pressure, a relay valve device operated by fluid under pressure for supplying fluid under pressure from said additional reservoir to the brake cylinder, and means operated upon effecting an emergency application of the brakes for supplying fluid under pressure to said relay valve device.

In testimony whereof I have hereunto set my hand.

JOSEPH M. DAPRON.